United States Patent
Robinson et al.

(10) Patent No.: US 6,813,353 B1
(45) Date of Patent: Nov. 2, 2004

(54) REDUNDANT OPERATION OF RING VOLTAGE GENERATORS UTILIZING VOLTAGE BUS SEGMENTATION FOR FAULT ISOLATION

(75) Inventors: Steven M. Robinson, Madison, AL (US); John S. McGary, Petersburg, TN (US); Ralph R. Boudreaux, Jr., Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/547,837

(22) Filed: Apr. 12, 2000

(51) Int. Cl.[7] .............................................. H04M 3/00
(52) U.S. Cl. .................. 379/418; 379/413.01; 379/350
(58) Field of Search .............................. 379/372, 377, 379/418, 399.01, 413, 413.01, 413.02, 382, 383, 384, 375.01, 221.03, 221.04, 221.05, 252, 256, 322, 324, 350

(56) References Cited

U.S. PATENT DOCUMENTS

| | | | | |
|---|---|---|---|---|
| 3,904,833 A | * | 9/1975 | Beene et al. | |
| 4,421,951 A | * | 12/1983 | Van Bosse | |
| 4,805,172 A | * | 2/1989 | Barbe et al. | 379/372 |
| 5,001,748 A | * | 3/1991 | Burns et al. | 379/418 |
| 5,161,152 A | * | 11/1992 | Czerwiec et al. | |
| 5,490,054 A | | 2/1996 | Hanebrink, Jr. | 363/21 |
| 5,666,480 A | | 9/1997 | Leung et al. | 395/180 |
| 6,272,209 B1 | * | 8/2001 | Bridger et al. | 379/27 |

* cited by examiner

Primary Examiner—Rexford Barnie
(74) Attorney, Agent, or Firm—Allen, Dyer, Doppelt, Milbrath & Gilchrist, P.A.

(57) ABSTRACT

A redundant ringing signal generator subdivides a ringing signal bus into multiple ringing bus segments. A plurality of redundant ringing voltage generators sourcing internally and/or externally ringing voltages are individually and selectively connectable to the multiple ringing bus segments. In the event of a prescribed anomaly in the ringing signal sourced by a ringing generator, the faulty ringing signal is automatically disconnected from its associated ringing bus segment, and that ringing bus segment is connected to a redundant ringing signal source, provided by either the same or another ringing generator.

20 Claims, 6 Drawing Sheets

REDUNDANT OPERATION OF RING VOLTAGE GENERATORS UTILIZING VOLTAGE BUS SEGMENTATION FOR FAULT ISOLATION

FIELD OF THE INVENTION

The present invention relates in general to ringing voltage generators for telephone networks, and is particularly directed to a new and improved ringing voltage supply scheme that involves the subdivision of a ringing bus into multiple ringing bus segments, to which redundant or auxiliary ringing voltage generators are selectively connectable, so as to ensure delivery of a ringing voltage signal as needed, regardless of a failure of a ringing voltage generator and/or removal of a ringing voltage generator card from its associated channel bank.

BACKGROUND OF THE INVENTION

Digital subscriber loop (DSL) channel banks often require the generation of an AC voltage as a ringing signal on a customer's POTS (plain old telephone service) line. This ringing signal is customarily generated as a periodic AC voltage waveform (e.g., sinusoidal, trapezoidal, etc.), having a relatively low frequency (for example, 16.5 Hz, 20 Hz, 25 Hz, 50 Hz are typical ringing frequencies). As a non-limiting example, the ringing voltage may comprise a sinusoidal waveform having an amplitude in a range on the order of from 40 to 120 Vrms riding on a DC voltage in a range on the order of from −30 to −70 VDC. In order to reduce amplitude variations for varying line/load conditions, it is generally desirable to employ closed loop regulation of the ringing voltage. In addition, it is also desirable to provide ringing voltage generation redundancy, in order to keep the telephone circuit operative in the event of a failure of a ringing generator module/card. Due to the statistical nature of the demand for ringing signal generation, it is further advantageous to have the full output power capability of any given ringing voltage generator available to meet peak demands.

Closed loop regulation of a sinusoidal (ringing) voltage that is available from multiple parallel-connected sources can involve the sharing of output voltage, feedback signals, reference voltages, and a reference (pulse width modulated (PWM)) clock. For true redundant or back-up operation, it is necessary to be able to isolate any ringing voltage generator in the event of a failure, since the failure of a generator connected directly in parallel with one or more other generators will disable every other unit until the failed generator can be identified and isolated or removed from the system. This can be a particularly cumbersome task, since identification of the faulty unit typically involves isolating and testing each generator on a one-by-one basis.

SUMMARY OF THE INVENTION

In accordance with the present invention, the desire to provide redundant telephone ringing voltage generator capability, without the shortcomings described above, is successfully addressed by subdividing the ringing voltage bus into multiple bus segments, and providing a plurality of redundant or auxiliary ringing voltage generators, that are individually and selectively connectable to multiple ringing bus segments. In the event of a failure of a ringing voltage generator, that faulty generator is automatically disconnected from its associated ringing bus segment, and that ringing bus segment is connected to a redundant ringing voltage generator.

In a first embodiment, a controlled ringing voltage source of each ringing generator is coupled to a failure detector and relay control circuit and to a relay circuit, which is configured to normally interconnect first and second ringing bus segments, and to isolate the ringing voltage generator from the ringing bus in the event of a failure. Only when energized does the relay couple the ringing voltage produced by the ringing voltage generator to its associated bus segment. Thus, if the relay control circuit detects an acceptable ringing voltage waveform from the ringing voltage generator, it energizes the relay, to isolate the two bus segments and couple the ringing voltage to its associated bus segment. However, if the failure detector and relay control circuit detects a faulty ringing voltage waveform from the ringing voltage generator, it maintains the state of its relay, so that the faulty ringing voltage is isolated, and both ringing bus segments are shorted together, to be supplied with a ringing voltage from the other 'redundant' ringing generator. Thus, as long as both ringing voltage generators are operating within normal parameters, each will supply a ringing voltage to its associated bus segment. However, during a failure, each voltage generator unit de-energizes its relay, so that its bus segment may be driven by the ringing generator associated with the other bus segment.

Although the first embodiment provides ringing voltage generation and fault isolation, it will not maintain the bus segments connected if either ringing generator module/card is physically removed from its channel bank card slot. To obviate this potential problem, switching path connections to the bus segments may be modified to include additional cross-coupled bus-shorting switching devices that are respectively controlled by the other ringing generator module. As in the first embodiment, if the failure detector and relay control circuit determines that the ringing voltage waveform is defective, it keeps its ringing voltage coupling relay de-energized, so that the defective ringing voltage generator is isolated from the ringing bus. In addition, it allows the bus-shorting relay on the other module to maintain the two bus segments coupled together, so that they may both receive ringing voltage from the other redundant generator.

In accordance with a third embodiment of the invention, auxiliary signals associated with the ringing voltage, such as zero-crossing signals, status signals, synchronization signals and the like, have their signaling paths segmented in association with the segmentation of the ringing voltage leads. For the case of zero-crossing signals, as a non-limiting example, zero-crossing detectors are provided to minimize noise transients and stress on downstream ringing voltage switching devices connected to the ringing bus segments. Each relay is configured as a double-pole relay to couple an additional zero-crossing detection signal to an associated zero-crossing line; the relay control circuit has a zero-crossing detection output that changes state at the time of occurrence of a zero-crossing in the monitored ringing voltage waveform.

As in the second embodiment, if the failure detector and relay control circuit determines that the monitored parameters of the ringing voltage waveform are acceptable, it operates an associated relay to couple the ringing generator to its associated bus segment, and to couple the zero-crossing output to the zero-crossing line associated with the ringing voltage generated by the ringing generator. However, for a faulty ringing voltage waveform, it will maintain the relay de-energized, so that the ringing bus segment is isolated from the ringing voltage generator and the zero-crossing output is isolated from the zero-crossing line.

In addition to the first double-pole relay, a respective ringing generator module of the third embodiment includes a second double-pole, bus-shorting relay coupled to the segmented ringing bus, and the segmented zero-crossing bus. This bus-shorting relay is controlled by an inverted output of the failure detector and relay control circuit of the other ringing generator module. This 'inverter-coupled' circuit configuration performs the same relay control functionality as the second embodiment; however, it operates only one relay at any time, and thereby reduces the amount of drive current required by the control signal and reduces power wasted in the relay during normal operation. The use of an inverter ensures that the contacts of each relay will be open at the time of insertion of the circuit card containing those relays into a channel bank, which eliminates surge currents and noise transients during card insertion.

The ringing voltage and zero-crossing redundancy functionality of the present invention may be extended to any number of ringing bus segments and associated ringing generator modules. In such extended configurations, the ringing bus segments are connected to their associated ringing generator modules in a daisy chain architecture so that failure of one or more ringing generator modules will short their associated bus segments and zero-crossing lines to a remaining one or more of the respective bus segments and zero-crossing lines.

In addition to the use of internal (card-installed) ringing voltage generators, the ringing voltage generator for one of the ringing generator modules may be external to the module, to accommodate the option of using internal ring generators (on plug-in cards) and/or external ring generators (large system generators). In a first 'external option' embodiment, the external ringing voltage is routed through the channel bank into the module which supplies a selected bus segment. Should the externally supplied ringing generator module fail, the internal ringing generator on the other module will supply a ringing voltage to both bus segments. If the internal ringing voltage generator within the other ringing generator module fails, the externally supplied ringing voltage will provide a ringing voltage to both bus segments.

The external option module can either replace the internal ringing voltage generator-based module or the module may employ both on-board ringing voltage generation and an external ringing voltage feed. With both internally sourced and externally supplied ringing voltage feeds on a single card, the user has the choice of which may is to used for powering the single bus (via a jumper or relay). In accordance with a further, external option embodiment, each ringing generator module includes a separate relay path, and an associated failure detector and relay control circuit for applying the externally supplied ringing voltage to the bus segment associated with that module. Each ringing generator has an external ringing voltage supply port is coupled to an external voltage failure detector and relay control circuit and to an external ringing voltage relay circuit, that is operative to controllably isolate the external ringing voltage port from its associated ringing bus segment in the absence of a failure. Only when this relay is energized in response to a failure of the internal voltage generator does the relay couple the external ringing voltage to its associated bus segment.

Should both the external ringing voltage and the internal ringing voltage of one module fail, the other module will be triggered to interconnect both bus segments and supply either its internal or externally supplied ringing voltage to the bus. Because of this dual redundancy, all four ringing voltage generators (two internal and two external) must fail before the channel bank loses ringing capability. If only one external ringing voltage source is available, the external voltage supply ports may be connected together by way of a jumper wire and the like. Changing the order of which module takes over for a failed ringing voltage source is readily effected by rearranging the logic circuits and relays.

DETAILED DESCRIPTION

Figure 1:
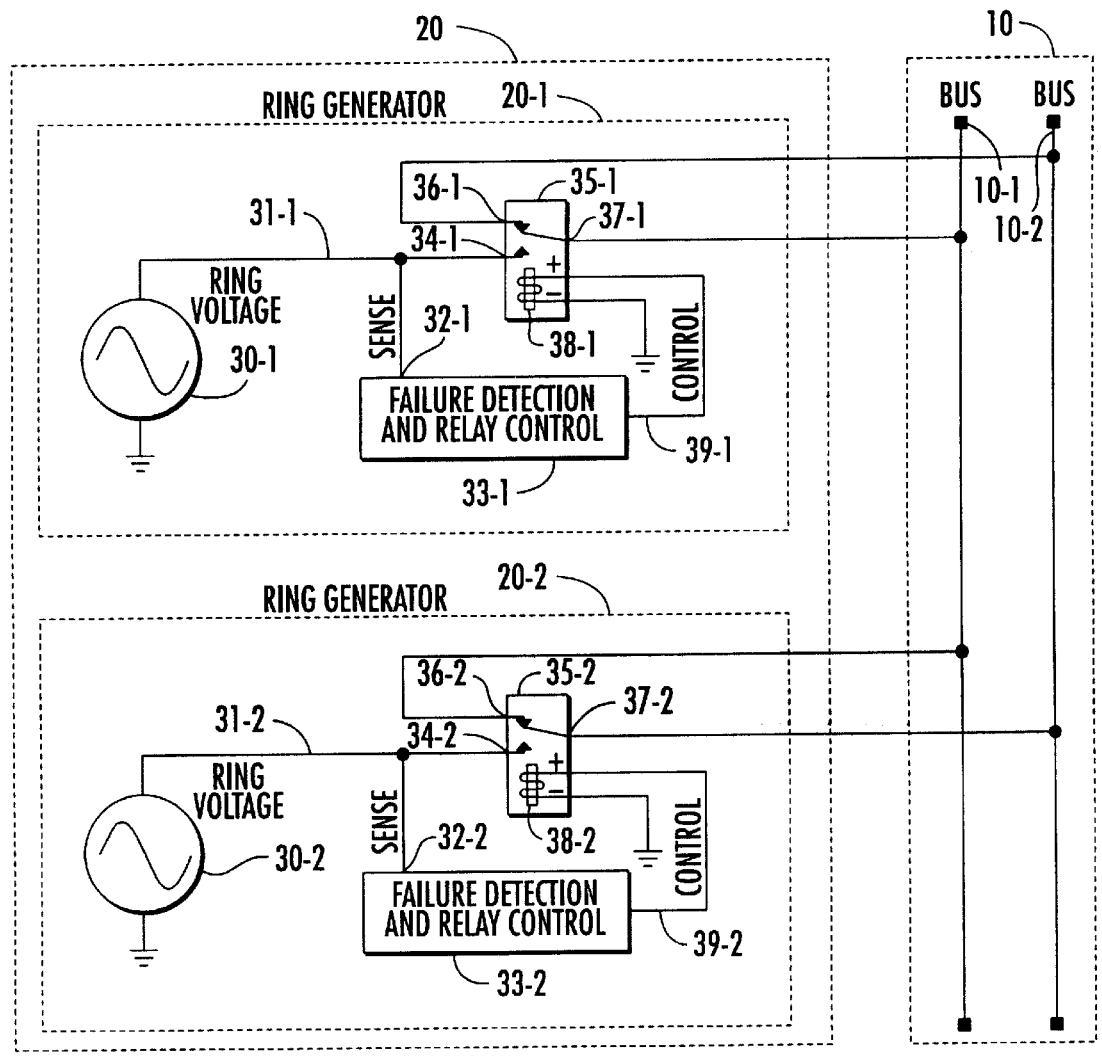
FIG. 1 diagrammatically illustrates a first embodiment of the segmented bus-based redundant ringing voltage generator architecture of the present invention.

Before describing in detail the new and improved redundant ringing voltage generator scheme of the present invention, it should be observed that the invention resides primarily in modular arrangements of conventional telephone communication circuits and associated digital signal processing components and attendant supervisory control circuitry therefor, that controls the operations of such circuits and components. In a practical implementation that facilitates their incorporation into existing printed circuit cards of telecommunication equipment, these modular arrangements may be readily implemented as field programmable gate array (FPGA)-implementation and application specific integrated circuit (ASIC) chip sets, in association with programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Attention is now directed to FIG. 1, which diagrammatically illustrates a first embodiment of the segmented bus-based redundant ringing voltage generator architecture of the present invention as comprising a segmented ringing bus 10, that is segmented into a plurality (two for purposes of a non-limiting, reduced complexity example) of bus segments 10-1 and 10-2, ringing voltages for which are supplied by an associated segmented ringing generator circuit 20 containing a plurality (two in the example) of ringing generators 20-1 and 20-2. It is to be understood that each bus segment serves (or is connected to) some number of subscriber telephone lines. In FIG. 1 and further FIGS. 2–6, to be described, the device used to connect the output of a ringing voltage generator and a bus segment is illustrated as a relay, as a non-limiting example. It is to be understood, however, that a variety of other controlled switching devices, including solid state components and circuits, may be used in its place.

For purposes of providing a concise description, the configuration of only ringing generator 20-1 will be detailed, as each ringing voltage generator is identical, so that the description of ringing generator 20-1 and its operation in association with bus segment 10-1 applies also to the configuration of ringing generator 20-2 and its operation in association with bus segment 10-2. For purposes of numerical identification consistency, the components of the 'first' ringing generator 20-1 are designated with numerical suffix (-1), while those of the 'second' ringing generator 20-2 are designated with numerical suffix (-2).

Within the first ringing generator (module) 20-1, the output of a controlled ringing voltage source 30-1 is coupled over a line 31-1 to the sense input 32-1 of a failure detector and relay control circuit 33-1, and also to a normally open contact 34-1 of a relay circuit 35-1. The ringing voltage generator 30-1 is operative to generate a AC signal, such as, but not limited to a 20 Hz sinusoidal ringing voltage having parameters referenced previously. The relay circuit 35-1 has a normally closed contact 36-1 coupled to ringing bus segment 10-1 and a common terminal 37-1 coupled to ringing bus segment 10-2. These relay terminal connections serve to controllably isolate the ringing voltage generator 30-1 from its associated ringing bus segment 10-1 in the event of a failure, as will be described. Only when an associated relay winding 38-1 is energized is the normally open contact 34-1 coupled to the common terminal 37-1, and thereby to its associated bus segment 10-1, coupling the ringing voltage produced by ringing voltage generator 30-1 to its associated bus segment 10-1.

The failure detector and relay control circuit 33-1 may be comprised of conventional signal level monitoring circuit components, coupled with an analog-to-digital interface and associated supervisory micro-controller, which is operative to monitor whether the ringing voltage waveform produced by the ringing voltage generator 30-1 conforms with prescribed ringing voltage parameters. The parameters sensed for failure detection are matters of design choice, and may include parameters such as RMS voltage, DC offset voltage, peak voltage, peak-to-peak voltage, frequency, crest factor, harmonic distortion, and/or other parameters.

The output of the control circuit 33-1 is coupled over a control line 39-1 to relay winding 38-1 within relay 35-1. In the course of application a ringing voltage to the bus segment 10-1, the failure detector and relay control circuit 33-1 determines whether the monitored parameters of the ringing voltage waveform produced by the ringing voltage generator 30-1 are 'within spec.' If so, it will change the output relay control signal applied by way of lead 39-1 to the relay winding 38-1 to a voltage value required to energize the relay winding 38-1. This serves to switch the connection of normally open contact 34-1 to the common terminal 37-1, and couple the line 31-1 from the ringing generator 20-1 to the bus segment 10-1, thereby isolating the bus segment 10-1 from the bus segment 10-2 and couple the ringing voltage generated by the ringing generator 20-1 to its associated bus segment 10-1.

However, if the failure detector and relay control circuit 33-1 determines that the monitored parameters of the ringing voltage waveform produced by the ringing voltage generator 30-1 are not within specification requirements, namely, a fault condition, it will maintain the state of its output relay control signal on control lead 39-1 to the relay winding 38-1 at a voltage level that maintains the normally closed contact 36-1 coupled to common terminal 37-1. This results in the ringing bus segment 10-1 being coupled to ringing bus segment 10-2, so that it may be supplied with a ringing voltage from the other 'redundant' or second ringing generator (module) 20-2.

Thus, as long as both ringing voltage generators 30-1 and 30-2 of their respective ringing generators 20-1 and 20-2 are operating within normal parameters, each will supply a ringing voltage to its associated bus segment. However, during a failure, each voltage generator unit de-energizes its relay, so that its bus segment may be driven by the ringing generator associated with the other bus segment. Although the embodiment of FIG. 1, provides redundant ringing voltage generation and fault isolation, it will not maintain the bus segments connected if either ringing generator is removed.

For example, when a failed unit is removed for replacement, the relay through which the bus segments are connected will be also be removed, thereby isolating the bus segments from one another and preventing ringing voltage redundancy. To obviate this situation, the switching path connections to the bus segments may be modified in the manner shown in FIG. 2, wherein a second 'bus-shorting' switching device is incorporated into each ringing generator and the connection paths through the relay of FIG. 1 are modified.

Figure 2:
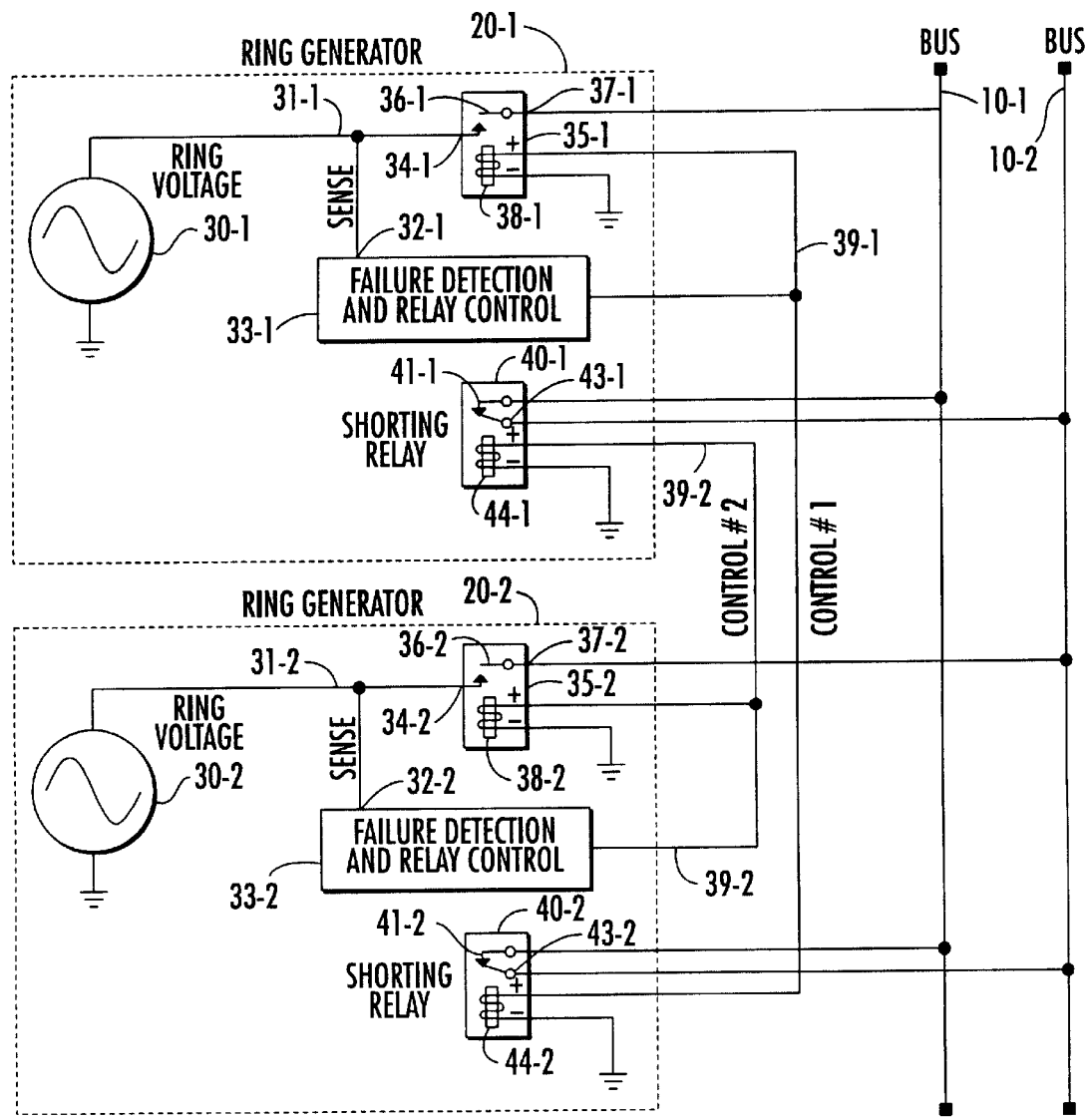
FIG. 2 shows a modification of the segmented bus-based redundant ringing voltage generator of FIG. 1 to include an auxiliary 'bus-shorting' switching device in each ringing generator module.

More particularly, as in the embodiment of FIG. 1, in the dual ringing generator example of the embodiment of FIG. 2, the first ringing generator 20-1 contains a controlled ringing voltage source 30-1 the ringing voltage output of which is coupled over line 31-1 to the sense input 32-1 of a failure detector and relay control circuit 33-1 and to a normally open contact 34-1 of a relay circuit 35-1. The relay circuit 35-1 has a normally open relay arm 36-1 coupled via terminal 37-1 to ringing bus segment 10-1. This normally open connection serves to controllably isolate the ringing voltage generator 30-1 from its associated ringing bus segment 10-1 in the event of a failure, as will be described. Only when a relay winding 38-1 is energized, is the normally open contact 34-1 coupled to the common terminal 37-1 and thereby to its associated bus segment 10-1, so as to couple the ringing voltage produced by ringing voltage generator 30-1 to its associated bus segment 10-1.

The failure detector and relay control circuit 33-1 is again operative to monitor whether the ringing voltage waveform produced by the ringing voltage generator 30-1 conforms with prescribed ringing voltage parameters, and has its control output coupled over control line 39-1 to relay winding 38-1. Control line 39-1 is also coupled as a control input to a winding 44-2 of a second, 'bus-shorting' relay 40-2 within the ringing generator 20-2, which is located on a separate physical card from the ringing generator. As in the first embodiment, the failure detector and relay control circuit 33-1 determines whether the monitored parameters of the ringing voltage waveform produced by the ringing voltage generator 30-1 are acceptable. If so, it will change the state of its output relay control signal on lead 39-1 to the relay winding 38-1 to a voltage level required to energize the relay winding 38-1. This serves to close the connection between normally open contact 34-1 and the common terminal 37-1, and thereby couple the line 31-1 from the ringing generator 20-1 to the bus segment 10-1, thereby coupling the ringing voltage generated by the ringing generator 20-1 to its associated bus segment 10-1. The low voltage level also de-energizes the relay winding 44-2 on the other card which uncouples the two buses.

However, if the failure detector and relay control circuit 33-1 determines that the ringing voltage waveform produced by the ringing voltage generator 30-1 is defective, it will maintain the state of its output relay control signal on control lead 39-1 to the relay winding 38-1 at a low voltage level that keeps relay 35-1 de-energized and the switch arm 36-1 in its normally open condition, so that the ringing bus segment 10-1 is isolated from the ringing voltage generator 30-1. In addition, this low voltage level de-energizes the relay winding 44-2 on the other card which shorts the buses together.

In addition to the first relay 35-1, the embodiment of FIG. 2 includes a second bus-shorting relay 40-1, having a normally closed relay contact 41-1 coupled to the first bus segment 10-1 and a common terminal 43-1 coupled to the second bus segment 10-2. Just as the relay winding 44-2 of the bus shorting relay 40-2 of the second ringing generator 20-2 is coupled to receive the output control signal generated by the failure detector and relay control circuit 33-1 of the first ringing generator 20-1, the bus shorting relay 40-1 of the ringing generator 20-1 has its relay winding 44-1 coupled to receive the output control signal generated by the failure detector and relay control circuit 33-2 of the second ringing generator 20-2. This cross-coupling of the control signals for the bus shorting relays 40-1 and 40-2 of ringing generators 20-1 and 20-2 functions to provide ringing voltage redundancy in the event of removal of the physical card containing the ringing generator of interest.

More particularly, since the control signal output 39-2 of the second ringing generator 20-2 provides the energizing control for winding 44-1 in the bus segment shorting relay 40-1 of the first ringing generator 20-1, failure or removal of the second ringing generator 20-2 will prevent a relay energizing voltage from being coupled by way of its control line 39-2 to the shorting relay winding 44-1 of the first ringing generator 20-1. As a consequence, the normally closed relay contact 41-1 of the relay 40-1 of the first ringing generator 20-1 will maintain the first bus segment 10-1 coupled through common terminal 43-1 to the second bus segment 10-2, so that the second bus segment 10-2 (which is disconnected from the second ringing generator 20-2) may receive its ringing voltage from the redundant first ringing generator 20-1.

Figure 3:
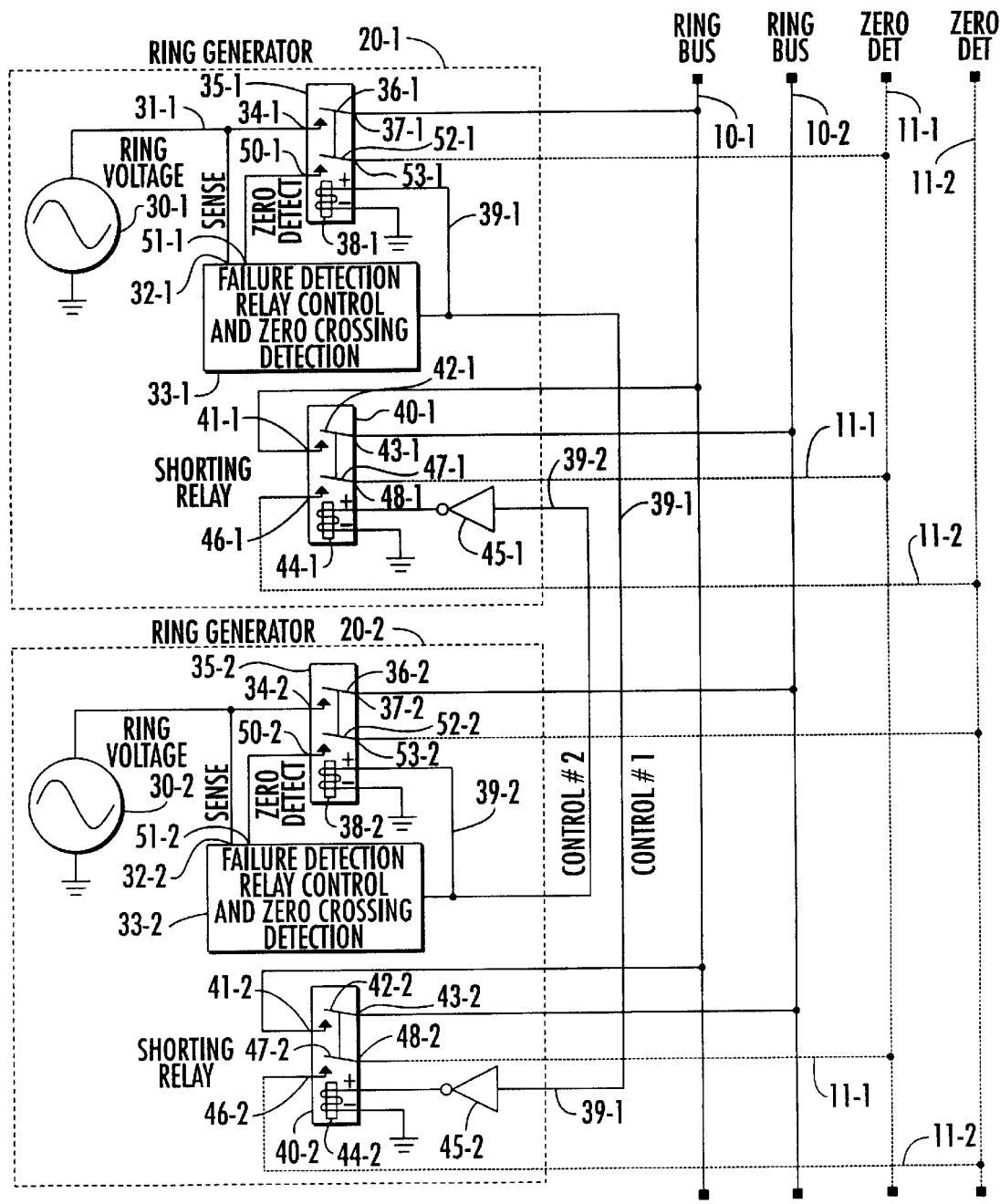
FIG. 3 diagrammatically illustrates a third embodiment of the invention, which provides redundant auxiliary signals associated with the ringing voltage.

FIG. 3 diagrammatically illustrates a third embodiment of the invention, which provides segmentation of signal paths for redundant auxiliary signals associated with the redundant ringing voltage segmentation. Such auxiliary signals may include, but are not limited to zero-crossing signals, synchronization signals, status signals and the like. In this third embodiment, the case of zero-crossing signals is illustrated, as a non-limiting example.

As shown in FIG. 3, the first ringing generator 20-1 contains a controlled ringing voltage source 30-1, the ringing voltage output of which is coupled over line 31-1 to the sense input 32-1 of a failure detector and relay control circuit 33-1 and to a first normally open contact 34-1 of first relay circuit 35-1, which is configured as a double-pole relay to accommodate an additional zero-crossing detection signal. For this purpose, relay circuit 35-1 has a first normally open relay arm 36-1 coupled via a first common terminal 37-1 to ringing bus segment 10-1. As in the embodiment of FIG. 2, this normally open connection serves to controllably isolate the ringing voltage generator 30-1 from its associated ringing bus segment 10-1 in the event of a failure. Only when a relay winding 38-1 is energized is the normally open contact 34-1 coupled to the common terminal 37-1 and thereby to its associated bus segment 10-1, so as to couple the ringing voltage produced by ringing voltage generator 30-1 to its associated bus segment 10-1.

The relay circuit 35-1 also has a second contact 50-1 coupled to a zero-crossing detection output 51-1 of control circuit 33-1. This additional, zero-crossing detection output 51-1 of the control circuit 33-1 changes state at the time of occurrence of a zero-crossing in the ringing voltage waveform generated by generator 30-1. Double pole-configured relay 35-1 further includes a second normally open relay arm 52-1, which is ganged with the first normally open relay contact arm 36-1 and is coupled via a second common terminal 53-1 to a zero-crossing line 11-1. This normally open connection for the zero-crossing signal isolates the zero-crossing signal associated with the ringing voltage generator 30-1 from its associated zero-crossing line 11-1 in the event of a failure. Only when relay winding 38-1 is energized is the normally open contact 50-1 coupled to the common terminal 53-1 and thereby to its associated zero-crossing lead 11-1, so as to couple the zero-crossing signal to line segment 11-1.

As in the second embodiment, the control line 39-1 from the relay control circuit 33-1 is further coupled as a control input to a winding 44-2 of a second, 'bus-shorting' relay 40-2 within the ringing generator 20-2 (located on a separate physical card from the ringing generator). As in the second embodiment, the failure detector and relay control circuit 33-1 determines whether the monitored parameters of the ringing voltage waveform produced by the ringing voltage generator 30-1 are 'within spec.' If so, it will change the state of its output relay control signal on lead 39-1 to a voltage level required to energize the relay winding 38-1. This closes the connection between normally open contact 34-1 and the common terminal 37-1, and thereby couples the line 31-1 from the ringing generator 20-1 to the bus segment 10-1, coupling the ringing voltage generated by the ringing generator 20-1 to its associated bus segment 10-1. It also couples the connection between normally open contact 50-1 and the common terminal 53-1, and thereby couples the zero-crossing output 51-1 of control circuit 33-1 to the zero-crossing line 11-1, associated with the ringing voltage generated by the ringing generator 20-1 and applied to its associated bus segment 10-1. This voltage level also disconnects the bus shorts, via inverter 45-2 and relay 40-2.

Like the second embodiment, if the failure detector and relay control circuit 33-1 determines that the ringing voltage waveform produced by the ringing voltage generator 30-1 is 'out of spec.', it will maintain the state of its output relay control signal on control lead 39-1 to the relay winding 38-1 at a low voltage level that keeps relay 35-1 de-energized and the switch arms 36-1 and 52-1 in their normally open conditions, so that the ringing bus segment 10-1 is isolated from the ringing voltage generator 30-1, and the zero-crossing output 51-1 of control circuit 33-1 is isolated from zero-crossing line 11-1. In addition, this voltage level also disconnects the bus shorts, via inverter 45-2 and relay 40-2.

In addition to the first relay 35-1, the third embodiment of FIG. 3 includes a second bus-shorting relay 40-1, having a relay contact 41-1 coupled to the first bus segment 10-1 and a common terminal 43-1 coupled to a normally open switch arm 42-1 and to the second bus segment 10-2. In the second embodiment, the relay winding 44-1 of the bus shorting relay 40-1 of the first ringing generator 20-1 is directly coupled to output control signal 39-2 generated by the failure detector and relay control circuit 33-2 of the second ringing generator 20-2.

In the third embodiment, with relay contact 41-1 normally open (rather than closed as in the second embodiment), the input to the relay winding 44-1 is an inverted version of the output control signal 39-2 generated by the failure detector and relay control circuit 33-2 of the second ringing generator 20-2. As a non-limiting example, an inverter circuit such as a driver inverter shown in the embodiments of FIGS. 3 and 4, or NAND gate circuit, shown in the embodiment of FIG. 6, may be installed in the signal path of the relay winding control signal. It should be observed, however, that other alternative, equivalent signal coupling schemes may be employed. For example, signal inversion may be effectively accomplished by operating the relay coils, while leaving the power rail disconnected. In this alternative scheme, grounding the relay winding would turn it on. Namely, a low signal would turn the relay on.

The 'inverter-coupled' circuit configuration performs the same relay control functionality as the embodiment of FIG. 2; however, it entails powering only one relay at any time, and thereby reduces the amount of drive current required by the control signal and reduces power wasted in the relay during normal operation. The use of an inverter also ensures that the contacts of each relay will be in the open condition at the time of insertion of the circuit card containing those relays into a channel bank. This has the advantage of completely eliminating any surge currents and noise transients during card insertion.

The shorting relay circuit 40-1 is also configured as a double pole device, having a second contact 46-1 coupled to a zero-crossing line 11-2 associated with the second bus segment 10-2. The double-pole shorting relay 46-1 further includes a second normally open relay arm 47-1, which is ganged with the first normally open relay contact arm 42-1 and is coupled via a second common terminal 48-1 to zero-crossing line 11-1. This normally open connection through the shorting relay isolates the zero-crossing line 11-1 associated with ringing generator 20-1 from the zero-crossing line 11-2 associated with ringing generator 20-2.

As pointed out above, the relay winding 44-1 is controlled by the inverted output of inverter 45-1 from the control output 39-2 of the failure detector and relay control circuit 33-2 of the second ringing generator 20-2. Since the normally open contact arm 47-1 is ganged with normally open contact arm 42-1, energizing the relay winding 44-1 also closes the connection between relay contact 46-1 and common terminal 48-1, and shorts the zero-crossing line 11-1 to zero-crossing line 11-2.

The above described embodiments of the dual ringing voltage and zero-crossing redundancy functionality of the present invention constitute reduced complexity examples of an N ring generator, N segmented bus architecture for the case that N=2. It is to be understood, however, that the invention is not limited to this or any particular subdivision of the ringing bus (and its associated zero-crossing line), but may be extended to any number of ringing bus segments and associated ringing generator modules. In such extended embodiments, the ringing bus segments may be connected to their associated ringing generator modules in such a manner that failure of one or more ringing generator modules will short their associated bus segments and zero-crossing lines to a remaining one or more of the respective bus segments and zero-crossing lines.

Figure 4:
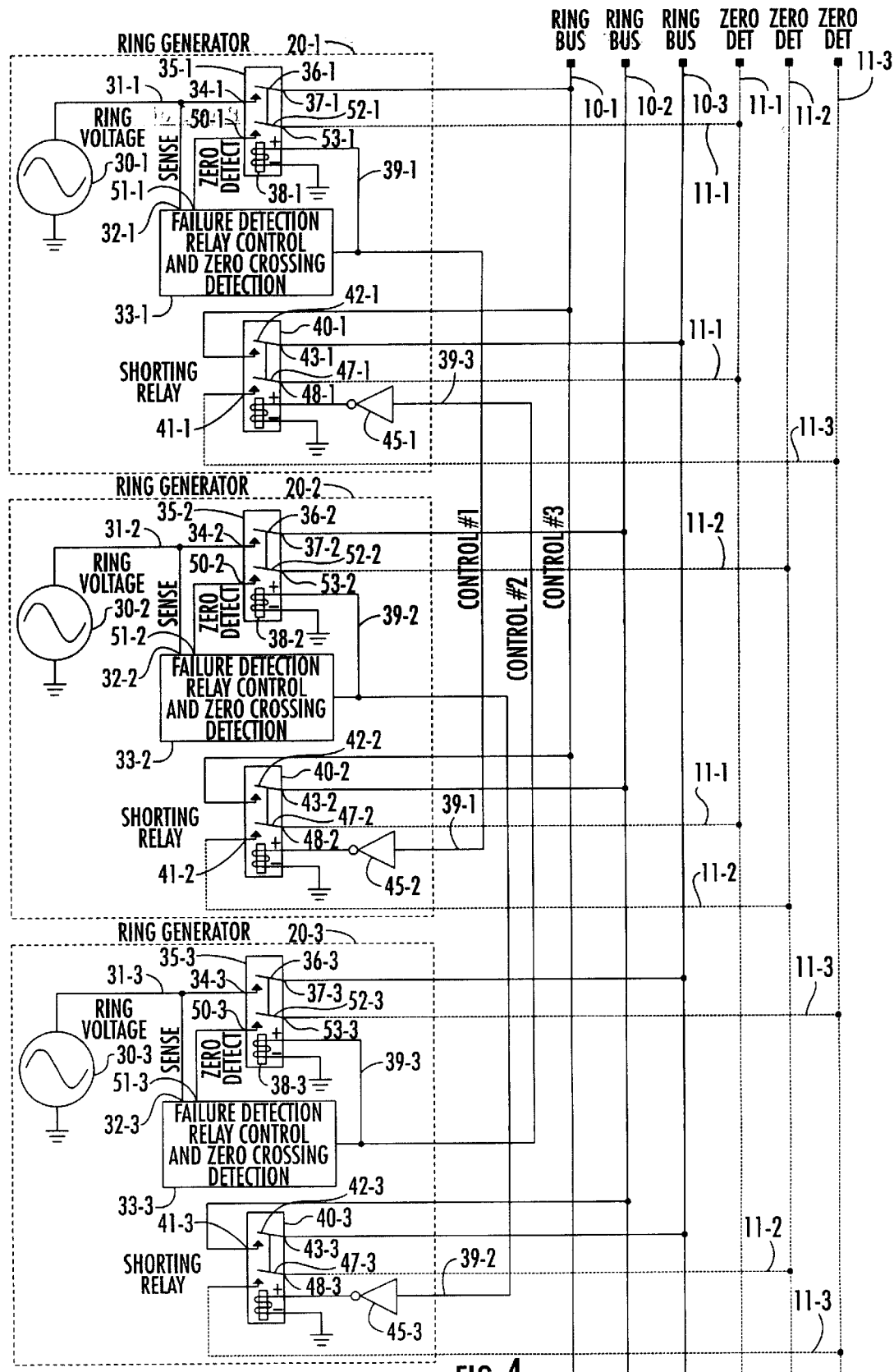
FIG. 4 diagrammatically illustrates an expansion of the embodiment of FIG. 3 into a three segmented ringing voltage generator module architecture.

As a non-limiting example, FIG. 4 diagrammatically illustrates an expansion of the embodiment of FIG. 3 for an N=3 segmented ringing voltage generator module architecture. In this fourth (three module/segmentation) embodiment, the ringing bus is subdivided into three ringing bus segments 10-1, 10-2 and 10-3, having an associated set of three ringing generator modules 20-1, 20-2 and 20-3, and zero-crossing lines 11-1, 11-2 and 11-3, respectively. The ringing bus segments and zero-crossing lines are connected to their associated ringing generator modules in a daisy-chain loop, so as to ensure ringing voltage and zero-crossing signal redundancy for a ringing voltage failure for one or two of the three ringing generator modules.

More particularly, to provide normal backup/redundancy for ringing bus segment 10-1 and zero-crossing line 11-1, in the event of a failure of their associated ringing module 20-1, is supplied through ringing generator module 20-2 in essentially the same manner for the embodiment of FIG. 3; by coupling ringing bus segments 10-1 and 10-2 and zero-crossing lines 11-1 and 11-2 through the shorting relay 40-2 of ringing generator module 20-2. As in the embodiment of FIG. 3, the operation of the shorting relay 40-2 is controlled through its drive inverter 45-2 under the control of a signal on the control line 39-1 from the relay control circuit 33-1 of the ringing generator module 20-1.

In the event of the additional failure of the ringing generator module 20-2, auxiliary back-up/redundancy for the bus segment 10-1 and the zero-crossing line 11-1 is provided through (closed) contacts arms 42-2 and 47-2 of the shorting relay 40-2 within ringing generator module 20-2 (interconnecting or shorting the bus segment 10-1 to the bus segment 10-2, and shorting the zero-crossing line 11-1 to the zero-crossing line 11-2), and the control led shorting of the ringing bus segments 10-2 and 10-3 and zero-crossing lines 11-2 and 11-3 by way of their associated contact arms 42-3 and 47-3 of the shorting relay 40-3 in the ringing generator 20-3. The shorting relay 40-2 in the ringing generator 20-2 is operated by its associated drive inverter 45-2, in response to the failure-representative signal on line 39-1 from the relay control circuit 33-1 of generator 20-1, while the shorting relay 40-3 in ringing generator 20-3 is operated by its drive inverter 45-3, in response to the failure-representative signal on line 39-2 from the relay control circuit 33-2 of generator 20-2.

Normal back-up/redundancy for ringing bus segment 10-2 and zero-crossing line 11-2 is supplied through ringing generator module 20-3 by coupling ringing bus segments 10-2 and 10-3 and zero-crossing lines 11-2 and 11-3 through the shorting relay 40-3 of the ringing generator module 20-3. The operation of the shorting relay 40-3 is controlled through inverter 45-3 under the control of a drive signal on the control line 39-2 from the relay control circuit 33-2 of ringing generator module 20-2. Should the ringing generator module 20-3 also fail, auxiliary backup/redundancy for the bus segment 10-2 and the zero-crossing line 11-2 is still provided through (closed) contacts arms 42-3 and 47-3 of the shorting relay 40-3 within ringing generator module 20-3 (shorting the bus segment 10-2 to the bus segment 10-3, and shorting the zero-crossing line 11-2 to the zero-crossing line 11-3), and the controlled shorting of ringing bus segments 10-1 and 10-2 and zero-crossing lines 11-1 and 11-2 by way of their associated contact arms 42-1 and 47-1 of shorting relay 40-1 in ringing generator 20-1. The shorting relay 40-3 in the ringing generator 20-3 is operated by its associated inverter 45-3, in response to the failure-representative signal on line 39-2 from the relay control circuit 33-2 of generator 20-2, while the shorting relay 40-1 in ringing generator 20-1 is operated by the inverter 45-1, in response to the failure-representative drive signal on line 39-3 from the relay control circuit 33-3 of generator 20-3.

Back-up/redundancy for the ringing bus segment 10-3 and the zero-crossing line 11-3 due to a failure of their associated ringing module 20-3 is supplied through ringing generator module 20-1, by coupling associated ringing bus segments 10-1 and 10-3 and zero-crossing lines 11-1 and 11-3 through shorting relay 40-1 of ringing generator module 20-1. The operation of the shorting relay 40-1 is controlled through inverter 45-1 under the control of a drive signal on the control line 39-3 from the relay control circuit 33-3 of ringing generator module 20-3. Should ringing generator module 20-1 also fail, auxiliary normal back-up/redundancy for the bus segment 10-3 and the zero-crossing line 11-3 is provided through (closed) contacts arms 42-1 and 47-1 of the shorting relay 40-1 within ringing generator module 20-1 (so as to short the bus segment 10-1 to the bus segment 10-3, and shorting the zero-crossing line 11-1 to the zero-crossing line 11-3), and the controlled shorting of ringing bus segments 10-1 and 10-2 and zero-crossing lines 11-1 and 11-2 by way of their associated contact arms 42-2 and 47-2 of shorting relay 40-2 in the ringing generator 20-2. The shorting relay 40-1 in the ringing generator 20-1 is operated by its associated inverter 45-1, in response to the failure-representative signal on line 39-3 from the relay control circuit 33-3 of generator 20-3, while the shorting relay 40-2 in the ringing generator 20-2 is operated by the inverter 45-2, in response to the failure-representative signal on line 39-1 from the relay control circuit 33-1 of generator 20-1.

In the embodiment of FIG. 4, with two of the three units failed, removing a failed ringing generator module for refurbishment or replacement can disconnect one bus segment and leave it unpowered. This shortcoming can be overcome either by replacing the two failed modules in the proper sequence, such that the non-shorting failed module is replaced first, or by installing a third shorting relay and associated connections to the other pair of bus segments and zero-crossing line, so that each module has the ability to interconnect all three bus segments.

Figure 5:
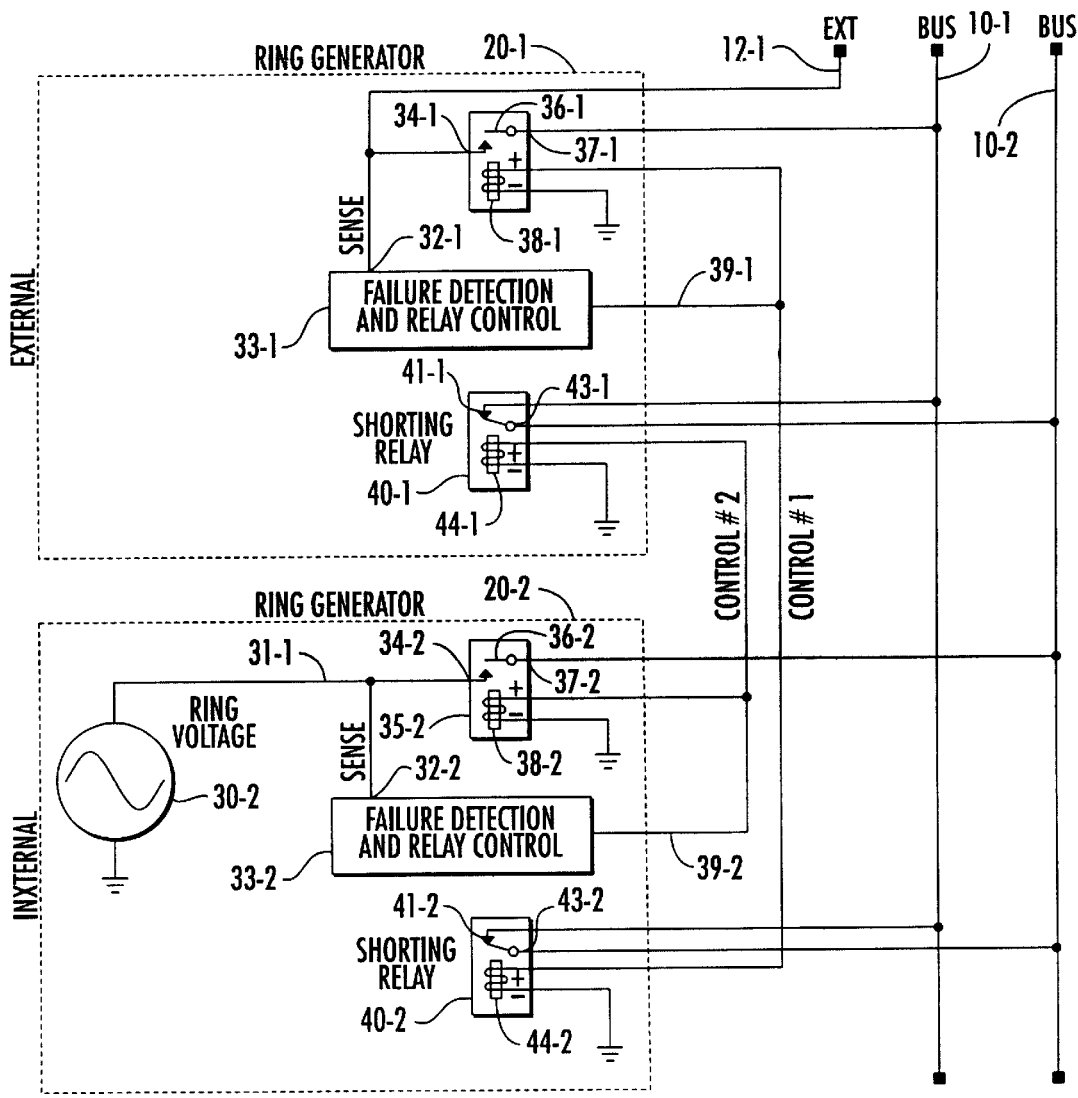
FIG. 5 shows another embodiment of the invention, in which the ringing voltage for a ringing generator module is sourced external to the module.

In accordance with a further embodiment of the invention, the ringing voltage for at least one ringing generator module may be sourced external to the module. As a non-limiting example, FIG. 5 shows ring generator module 20-1 containing no internal ringing voltage source. Instead its ringing voltage is derived from an external ringing voltage port 12-1, which is coupled to an external source. It should be observed that this embodiment is not limited to the number of generators which may employ external ringing voltages. Indeed, any or all of the ringing generator modules may be so externally ported. A typical channel bank has the option to use internal ring generators (on plug-in cards) and/or external ring generators (large system generators). The segmented redundancy architecture present invention allows such an external ringing voltage generator to be employed with internal units, and vice versa.

In the non-limiting example of FIG. 5, the external ringing voltage applied to port 12-1 is routed through the channel bank into the plug-in card or module 20-1 which supplies the segmented bus 10-1. Should the externally supplied ringing generator module 20-1 fail, ringing generator 20-2 will supply a ringing voltage to both bus segments 10-1 and 10-2, as described above. If the internal ringing voltage generator 30-2 within ringing generator module 20-1 fails, the externally supplied ringing voltage applied to ringing voltage port 12-1 will supply a ringing voltage to both bus segments 10-1 and 10-2 through module 20-1.

The external option module can either replace the internal ringing voltage generator-based module or the module may employ both on-board ringing voltage generation and an external ringing voltage feed. With both internally sourced and externally supplied ringing voltage feeds on a single card, the user may choose which one may be used for powering the single bus (via jumper or relay) or alternatively use the embodiment shown in FIG. 6 described below.

Figure 6:
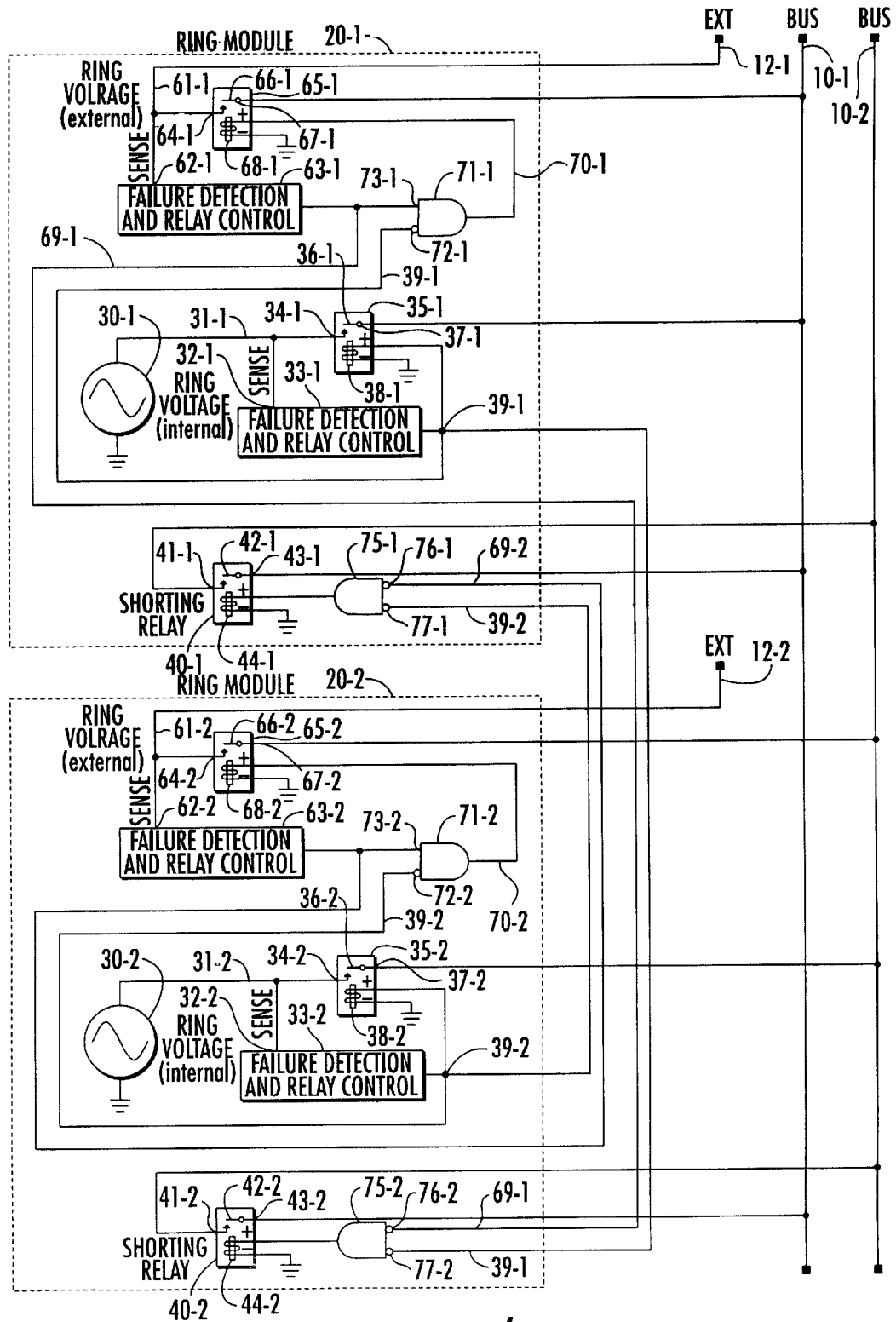
FIG. 6 diagrammatically illustrates a further embodiment of the invention, in which each ringing generator module includes a separate relay path, and an associated failure detector and relay control circuit for applying an externally supplied ringing voltage to the bus segment associated with that module.

More particularly, in the embodiment of FIG. 6, each ringing generator module includes a separate relay path, and an associated failure detector and relay control circuit for applying an externally supplied ringing voltage to the bus segment associated with that module. (For clarity, the redundant auxiliary buses and connections are not shown.) In the first ringing generator 20-1, the external ringing voltage supply port 12-1 is coupled over a 61-1 to the sense input 62-1 of an external voltage failure detector and relay control circuit 63-1 and to a normally open contact 64-1 of an external ringing voltage relay circuit 65-1.

Relay circuit 65-1 has a normally open relay arm 66-1 coupled via terminal 67-1 to ringing bus segment 10-1. This normally open connection serves to controllably isolate the external ringing voltage port 12-1 from its associated ringing bus segment 10-1 in the absence of a failure. Only when relay winding 68-1 is energized by an output lead 70-1 from a gate circuit 71-1, in response to a failure of the internal voltage generator 30-1 supplied to an inverting input 72-1 over line 39-1 from relay control circuit 35-1, is the normally open contact 64-1 of relay 65-1 coupled to the common terminal 67-1 and thereby to bus segment 10-1, so as to couple the external ringing voltage applied to the external port 12-1 to bus segment 10-1.

Gate circuit 71-1 has a second input 73-1 coupled to over line 69-1 to the output of the external voltage failure detector and relay control circuit 63-1. The relay control output line 69-1 is further coupled to a first input 76-2 of a NAND gate 75-2 in the second ringing voltage generator 20-2, which controls the operation of the that generator's relay winding 44-2. NAND gate 75-2 has a second input 77-2 coupled over line 39-1 from the output of internal voltage failure detector and the relay control circuit 33-1 in the first ringing voltage generator 20-1.

In response to a failure of each of the external ringing voltage at port 12-1 and the internal ringing voltage generator 30-1, both lines 39-1 and 69-1 will go low, causing NAND gate 75-2 to operate the shorting relay 40-2 and thereby interconnect the bus segments 10-1 and 10-2 through the second ringing generator module 20-1.

In a complementary manner, the relay control output line 69-2 from the external voltage failure detector and the relay control circuit 63-2 is coupled to a first input 76-1 of NAND gate 75-1, which controls the operation of relay winding 44-1 of ring generator module 20-1. NAND gate 75-1 has a second input 77-1 coupled over line 39-2 from the output of internal voltage failure detector and the relay control circuit 33-2 in the second ringing voltage generator 20-2. In response to a failure of both the external ringing voltage at external port 12-2 and the internal ringing voltage generator 30-2, both lines 39-2 and 69-2 will go low, causing the output of NAND gate 75-1 to change state and operate the shorting relay 40-1 and thereby interconnect the bus segments 10-1 and 10-2 through the first ringing generator module 20-1.

As a result of this dual redundancy, the embodiment of FIG. 6 requires the failure of all four ringing voltage generators (two internal and two external) before the channel bank loses ringing capability. If only one external ringing voltage source is available the external voltage supply ports may be connected together by way of a jumper wire or the like. Changing the order of which module takes over for a failed ringing voltage source can be readily effected by simply rearranging the logic circuits and relays. As a non-limiting example, the ringing generator module 20-2 may be employed as the primary back-up for internal voltage generator 30-1, and the external ringing voltage may be used for secondary redundancy.

As will be appreciated from the foregoing description, the desire to provide redundant telephone ringing voltage generator capability, without the shortcomings of conventional ringing voltage supply architectures is successfully addressed by subdividing the ringing voltage bus into multiple bus segments, and providing a plurality of redundant ringing voltage generators (internal and/or external), that are individually and selectively connectable to multiple ringing bus segments. In the event of a failure of a ringing voltage generator, that faulty generator is automatically disconnected from its associated ringing bus segment, and that ringing bus segment is connected to a redundant ringing voltage generator.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An apparatus for controllably supplying ringing signals to a plurality of telecommunication circuits comprising:
    a plurality of electrically isolatable ringing signal bus segments through which ringing signals applied thereto are delivered to one or more of said plurality of telecommunication circuits; and
    a plurality of redundant ringing voltage generators providing internally and/or externally sourced ringing voltages and being selectively connectable to said plurality of ringing bus segments, and wherein a respective ringing voltage generator is operative, in response to the ringing signal provided thereby being within a prescribed specification, to connect said ringing signal to its associated ringing bus segment, and to isolate said associated ringing bus segment from another ringing bus segment but, in response to a prescribed anomaly in the ringing signal provided thereby, to disconnect said ringing signal from said associated ringing bus segment, and to connect said associated ringing bus segment to a redundant ringing signal and further comprising a bus-shorting relay operatively connected to respective ringing signal bus segments and controlled by said ringing voltage generator to short together ringing signal bus segments and provide said ringing bus signal.

2. A method of controllably supplying ringing signals to a plurality of telecommunication circuits comprising the steps of:
    (a) providing a plurality of electrically isolatable ringing signal bus segments through which ringing signals applied thereto are delivered to one or more of said plurality of telecommunication circuits;
    (b) controllably isolating respective ones of said ringing bus segments from one another and supplying respective ringing signals to said plurality of ringing signal bus segments for delivery thereby to said one or more of said plurality of telecommunication circuits; and
    (c) in response to an abnormality in a ringing signal to be supplied to a respective ringing signal bus segment, controllably supplying to said respective ringing signal bus segment a ringing signal associated with another of said plurality of ringing signal bus segments by shorting together ringing signal bus segments and providing the ringing bus signal by a bus-shorting relay controlled by the ringing voltage generator.

3. An apparatus according to claim 1, wherein said respective ringing voltage generator is operative, in response to said prescribed anomaly in its ringing signal, to automatically disconnect said ringing signal from its associated ringing bus segment, and to connect said associated ringing bus segment to a redundant ringing signal provided by another ringing generator.

4. An apparatus according to claim 1, wherein said respective ringing voltage generator is operative, in response to said prescribed anomaly in its ringing signal, to automatically disconnect said ringing signal from its associated ringing bus segment, and to connect said associated ringing bus segment to a redundant ringing signal provided the same ringing generator.

5. An apparatus according to claim 4, wherein said redundant ringing signal is externally sourced.

6. An apparatus according to claim 1, further including a plurality of paths for transporting auxiliary signals associated with ringing signals to be coupled by respective ringing generators to said ringing signal bus segments, and wherein said respective ringing generator is further operative to normally controllably couple an auxiliary signal to its associated path and, in response to said abnormality in a ringing signal to be supplied to its associated ringing signal bus segment, to controllably couple said auxiliary signal to said associated path.

7. A method according to claim 2, wherein step (b) comprises coupling, to said plurality of ringing signal bus segments, respective ringing signal generators which are normally operative to couple ringing signals to respective ones said ringing signal bus segments, and wherein step (c) comprises, in response to an abnormal ringing signal generated by a respective ringing signal generator, preventing said abnormal ringing signal from being applied to any of said plurality of ringing signal bus segments, and coupling instead a normal ringing signal produced by another ringing signal generator to plural ringing signal bus segments.

8. A method according to claim 2, wherein
    step (a) further includes providing a plurality of paths for transporting auxiliary signals associated with ringing signals respectively coupled to said ringing signal bus segments,
    step (b) further comprises controllably coupling said auxiliary signals to said plurality of paths, and
    step (c) comprises, in response to said abnormality in a ringing signal to be supplied to a respective ringing signal bus segment, controllably supplying to a path, associated with said respective signal bus segment, an auxiliary signal associated with the ringing signal supplied to said another of said plurality of ringing signal bus segments.

9. A method according to claim 8, wherein said auxiliary signals are representative of occurrences of zero-crossings in ringing signals respectively coupled to said ringing signal bus segments.

10. A method according to claim 2, wherein step (b) comprises installing a plurality of ringing generator circuits in a telephone network channel bank, each of said ringing generator circuits being operative to controllably couple a respective ringing signal to an associated ringing signal bus segment, and wherein step (c) comprises, in response to an abnormality in a ringing signal provided by the ringing signal generator of a respective ringing generator circuit, controllably decoupling said respective ringing generator circuit from its associated ringing signal bus segment, and coupling instead a ringing signal provided by the ringing signal generator of another ringing generator circuit.

11. A method according to claim 10, wherein each of said ringing generator circuits is coupled to receive an externally generated ringing signal, and wherein step (c) comprises, in response to an abnormality in a ringing signal provided by a ringing signal generator of a respective ringing generator circuit, controllably decoupling said ringing signal generator from its associated ringing signal bus segment, and coupling instead said externally generated ringing signal to said associated ringing signal bus segment.

12. A method according to claim 11, wherein step (b) comprises installing a plurality of ringing generator circuits in a telephone network channel bank, at least one of said ringing generator circuits being operative to controllably couple a respective ringing signal to an associated ringing signal bus segment, and wherein at least one of said ringing generator circuits is coupled to receive an externally generated ringing signal, and wherein step (c) comprises, in response to an abnormality in a ringing signal provided by a respective ringing generator circuit, controllably decoupling said ringing signal generator of said respective ringing generator circuit from its associated ringing signal bus segment, and coupling instead an externally generated ringing signal to said associated ringing signal bus segment.

13. A method according to claim 2, wherein step (b) comprises installing a plurality of ringing generator circuits in a telephone network channel bank, at least one of said ringing generator circuits containing an internal ringing signal generator, which provides a respective ringing signal to be controllably coupled to an associated ringing signal bus segment, and at least one of said ringing generator circuits being coupled to receive an externally generated ringing signal for application to an associated ringing signal bus segment, and wherein step (c) comprises, in response to an abnormality in a ringing signal to be coupled by a respective ringing generator circuit to its associated ringing signal bus segment, controllably decoupling said ringing generator circuit from its associated ringing signal bus segment, and coupling thereto instead a ringing signal from another ringing generator circuit.

14. A method according to claim 2, wherein steps (b) and (c) are carried out by controlled switch connections between sources of ringing signals and said ringing signal bus segments.

15. An apparatus for controllably supplying ringing signals to a plurality of telecommunication circuits comprising:

a plurality of electrically isolated ringing signal bus segments through which ringing signals applied thereto are delivered to one or more of said plurality of telecommunication circuits; and a plurality of ringing generators, a respective one of which is operative to normally controllably supply a respective ringing signal to an associated ringing signal bus segment for delivery thereby to said one or more of said plurality of telecommunication circuits, and which is further operative, in response to an abnormality in said ringing signal, to controllably couple a ringing signal from another ringing generator to said respective ringing signal bus segment and further comprising a bus-shorting relay operatively connected to respective ringing signal bus segments and controlled by said ringing voltage generator to short together ringing signal bus segments and provide said ringing bus signal.

16. An apparatus according to claim 15, further including a plurality of paths for transporting auxiliary signals associated with ringing signals to be coupled by respective ringing generators to said ringing signal bus segments, and wherein said respective ringing generator is further operative to normally controllably couple an auxiliary signal to its associated path and, in response to said abnormality in a ringing signal to be supplied to its associated ringing signal bus segment, to controllably couple said auxiliary signal to said associated path.

17. An apparatus according to claim 15, wherein said auxiliary signals are representative of occurrences of zero-crossings in said ringing signals.

18. An apparatus to claim 17, wherein at least one of said ringing generators is coupled to receive an externally generated ringing signal, and is operative, in response to said abnormality in a ringing signal, to controllably decouple said ringing signal generator from its associated ringing signal bus segment, and to couple instead an externally generated ringing signal to said associated ringing signal bus segment.

19. An apparatus according to claim 15, wherein at least one of said ringing generators contains an internal ringing signal generator sourcing a respective ringing signal to be controllably coupled to an associated ringing signal bus segment, and at least one of said ringing generators is coupled to receive an externally generated ringing signal for application to an associated ringing signal bus segment, and wherein a respective ringing generator is operative, in response to an abnormality in a ringing signal supplied thereby, to controllably decouple the ringing signal supplied thereby from its associated ringing signal bus segment, and to coupled thereto instead a ringing signal from another ringing generator.

20. An apparatus according to claim 15, wherein a respective ringing generator includes controlled switch connections between one or more sources of ringing signals and said associated ringing signal bus segment.

* * * * *